(12) United States Patent
Komatsu

(10) Patent No.: US 9,909,024 B2
(45) Date of Patent: Mar. 6, 2018

(54) INK COMPOSITION FOR INK JET TEXTILE PRINTING AND TEXTILE PRINTING METHOD

(71) Applicant: Seiko Epson Corporation, Tokyo (JP)

(72) Inventor: Hidehiko Komatsu, Chino (JP)

(73) Assignee: Seiko Epson Corporation, Tokyo (JP)

(*) Notice: Subject to any disclaimer, the term of this patent is extended or adjusted under 35 U.S.C. 154(b) by 535 days.

(21) Appl. No.: 14/573,852

(22) Filed: Dec. 17, 2014

(65) Prior Publication Data

US 2015/0166807 A1 Jun. 18, 2015

(30) Foreign Application Priority Data

Dec. 17, 2013 (JP) ................................. 2013-260135

(51) Int. Cl.
*C09D 11/328* (2014.01)
*C09D 11/38* (2014.01)
(Continued)

(52) U.S. Cl.
CPC ............ *C09D 11/328* (2013.01); *C08K 5/053* (2013.01); *C08K 5/17* (2013.01); *C08K 5/19* (2013.01);
(Continued)

(58) Field of Classification Search
CPC ...... C09D 11/328; C09D 11/38; C08K 5/053; C08K 5/17; C08K 5/19; C08K 5/21; C08K 5/3492
(Continued)

(56) References Cited

U.S. PATENT DOCUMENTS 5,074,914 A * 12/1991 Shirota ................ C09D 11/328
106/31.51
5,250,121 A * 10/1993 Yamamoto .................. B41J 2/01
106/31.46
(Continued)

FOREIGN PATENT DOCUMENTS

JP        06-271801 A     9/1994
JP        2002-241639 A   8/2002
(Continued)

OTHER PUBLICATIONS

Thiodiglycol Compound Summary; National Center for Biotechnology Information; PubChem Compound Database; CID=5447; https://pubchem.ncbi.nlm.nih.gov/compound/thiodiglycol; no date available; 60 pages.*

*Primary Examiner* — Helene Klemanski
(74) *Attorney, Agent, or Firm* — Nutter McClennen & Fish LLP; John J. Penny, Jr.; Alex Nagorniy

(57) ABSTRACT

The ink composition for ink jet textile printing according to the invention is an ink composition which includes each dye satisfying the following conditions A, B, and C, two or more kinds of solvent having a boiling point of 190° C. or higher and lower than 260° C. under a pressure of 1 atm, and water, in which the solvent includes 5% by mass or greater of a nitrogen-containing heterocyclic compound with respect to the total mass of the ink composition and 5% by mass or greater of an alkyl polyol with respect to the total mass of the ink composition.

A: Maximum absorption wavelength is in a range of 550 nm and 750 nm

B: Maximum absorption wavelength is in a range of 450 nm or greater and less than 500 nm C: Maximum absorption wavelength is in a range of 400 nm or greater and less than 450 nm.

14 Claims, 1 Drawing Sheet

(51) Int. Cl.
*C08K 5/053* (2006.01)
*C08K 5/17* (2006.01)
*C08K 5/19* (2006.01)
*C08K 5/21* (2006.01)
*C08K 5/3492* (2006.01)

(52) U.S. Cl.
CPC .............. *C08K 5/21* (2013.01); *C08K 5/3492* (2013.01); *C09D 11/38* (2013.01)

(58) Field of Classification Search
USPC .......... 106/31.46, 31.47, 31.49, 31.58, 31.48
See application file for complete search history.

(56) References Cited

U.S. PATENT DOCUMENTS

| | | | | |
|---|---|---|---|---|
| 5,584,918 | A * | 12/1996 | Suzuki | D06P 1/67366 106/31.47 |
| 5,698,478 | A * | 12/1997 | Yamamoto | D06P 1/5242 347/105 |
| 5,902,387 | A * | 5/1999 | Suzuki | B41J 2/17503 106/31.47 |
| 6,007,611 | A * | 12/1999 | Mheidle | D06P 5/30 106/31.47 |
| 6,254,231 | B1 | 7/2001 | Suzuki et al. | |
| 6,432,186 | B1 * | 8/2002 | Taniguchi | C09D 11/328 106/31.58 |
| 8,757,784 | B2 * | 6/2014 | Aoyama | C09D 11/38 347/20 |
| 8,992,675 | B2 * | 3/2015 | Komatsu | C09D 11/38 106/31.58 |
| 9,290,672 | B2 * | 3/2016 | Komatsu | C09D 11/106 |
| 2003/0060608 | A1 * | 3/2003 | Hasemann | C09D 11/328 106/31.47 |
| 2003/0116058 | A1 * | 6/2003 | Hopper | C09D 11/38 106/31.43 |
| 2003/0172840 | A1 * | 9/2003 | Blank | D06P 5/30 106/31.58 |
| 2003/0177945 | A1 | 9/2003 | Li et al. | |
| 2003/0199611 | A1 | 10/2003 | Chandrasekaran et al. | |
| 2011/0007110 | A1 * | 1/2011 | Shimizu | C09D 11/328 106/31.47 |
| 2014/0157530 | A1 * | 6/2014 | Murai | C09D 11/328 8/549 |
| 2016/0214401 | A1 * | 7/2016 | Komatsu | C09D 11/005 |
| 2016/0230334 | A1 * | 8/2016 | Oki | C09D 11/328 |

FOREIGN PATENT DOCUMENTS

| | | |
|---|---|---|
| JP | 2003-012976 A | 1/2003 |
| JP | 2005-047990 A | 2/2005 |
| JP | 2011-195677 A | 10/2011 |
| JP | 2011-195679 A | 10/2011 |

* cited by examiner

INK COMPOSITION FOR INK JET TEXTILE PRINTING AND TEXTILE PRINTING METHOD

BACKGROUND

1. Technical Field

The present invention relates to an ink composition for ink jet textile printing and a textile printing method using the same.

2. Related Art

An ink jet recording method is a method in which printing is performed by discharging small droplets of ink from fine nozzle heads to be flown and by adhering the small droplets of ink on a recording medium such as paper. The method has a feature that images with a high-resolution and a high-quality can be printed at a high speed using a relatively inexpensive apparatus. In an ink composition used in such an ink jet recording method, various coloring materials or solvents are used according to a recording medium used.

For example, JP-A-2003-12976 discloses that an ink composition used when an image is printed on plain paper contains a reactive dye, an organic solvent, water, a surfactant, and the like. In the ink composition disclosed in JP-A-2003-12976, an organic solvent such as ethylene glycol or glycerin is used from the viewpoint of ink storage stability and permeability to a recording medium.

On the other hand, JP-A-2002-241639 discloses that an ink composition used when an image is printed on a fabric (so-called ink jet textile printing) contains a reactive dye, a hydrophilic organic solvent, tris(hydroxymethyl)aminomethane, water, and the like. In the ink composition disclosed in JP-A-2002-241639, a hydrophilic organic solvent such as propylene glycol or 2-pyrrolidone is used from the viewpoint of preventing occurrence of solids by drying.

However, in a case of using the ink composition described in JP-A-2003-12976 and JP-A-2002-241639 in ink jet textile printing, there is a case where occurrence of discharging failure of the ink discharged from the nozzles of a recording head cannot be sufficiently suppressed. Specifically, there are cases where it is not possible to sufficiently dissolve a dye depending on the type of a solvent, and when using a solvent having a low boiling point, the ink adhered near the nozzles solidifies, or when using a solvent having a high boiling point, the ink adhered near the nozzles thickens. In this manner, depending on the boiling point or the type of the solvent included in the ink composition, clogging of the nozzles may occur, and due to this, discharging failure of an ink may be caused.

In addition, in a case of performing ink jet textile printing, there is a case of performing heat treatment such as steaming after forming an image in order to improve a dyeing property of the dye applied to a fabric. However, depending on the boiling point or the type of the solvent included in the ink composition, dyeing of a dye may be inhibited during the heat treatment, and deterioration in coloring properties of an image may become more significant.

Meanwhile, when expressing a desired tone using an ink composition, one dye may be used, however, in order to further improve color reproduction, a plurality of dyes may be used in combination. However, since dyes having a wide variety of tones may be present, there may be cases in which it is difficult to find a combination of dyes having excellent color reproducibility. In particular, in the case of expressing a black tone, it is necessary to make the recorded image be close to an achromatic color, however, it is very difficult to find a combination of such dyes.

SUMMARY

An advantage of some aspects of the invention is to provide an ink composition for ink jet textile printing capable of recording an image having an excellent discharging property, excellent color reproducibility and coloring properties, and a textile printing method using the same.

The invention can be realized as the following aspects or application examples.

APPLICATION EXAMPLE 1

An aspect of an ink composition for ink jet textile printing according to the invention is an ink composition which includes each dye satisfying the following conditions A, B, and C, two or more kinds of solvent having a boiling point of 190° C. or higher and lower than 260° C. under a pressure of 1 atm, and water, in which the solvent includes 5% by mass or greater of a nitrogen-containing heterocyclic compound with respect to the total mass of the ink composition and 5% by mass or greater of an alkyl polyol with respect to the total mass of the ink composition.

A: Maximum absorption wavelength is in a range of 550 nm to and 750 nm
B: Maximum absorption wavelength is in a range of 450 nm or greater and less than 500 nm
C: Maximum absorption wavelength is in a range of 400 nm or greater and less than 450 nm According to the ink composition for ink jet textile printing of Application Example 1, it is possible to record an image having an excellent discharging property, excellent color reproducibility and coloring properties.

APPLICATION EXAMPLE 2

In the ink composition for ink jet textile printing according to Application Example 1, the dye satisfying the following condition A may include at least one kind of C. I. Reactive Black 39, C. I. Reactive Blue 49, and C. I. Reactive Blue 72, the dye satisfying the following condition B may include at least one of C. I. Reactive Orange 13 and C. I. Reactive Brown 11, and the dye satisfying the following condition C may include at least one kind of C. I. Reactive Orange 12, C. I. Reactive Orange 99, and C. I. Reactive Yellow 95.

APPLICATION EXAMPLE 3

In the ink composition for ink jet textile printing according to Application Example 1 or 2, the content of the dye satisfying the following condition A is 10% by mass or greater with respect to the total mass of the ink composition, and the total amount of the dye can be 13% by mass or greater.

APPLICATION EXAMPLE 4

In the ink composition for ink jet textile printing according to any one of Application Examples 1 to 3, an alkyl polyol having a boiling point of 260° C. or higher under a pressure of 1 atm may not be substantially contained.

APPLICATION EXAMPLE 5

In the ink composition for ink jet textile printing according to any one of Application Examples 1 to 4, the absorbance at the maximum absorption wavelength in a case of using an aqueous solution including each dye satisfying the following conditions A, B, and C in a concentration of 10 ppm can be 0.3 or greater, respectively.

APPLICATION EXAMPLE 6

In the ink composition for ink jet textile printing according to any one of Application Examples 1 to 5, a dye of which the maximum absorption wavelength is in a range of 500 nm or greater and less than 550 nm may be further included.

APPLICATION EXAMPLE 7

In the ink composition for ink jet textile printing according to any one of Application Examples 1 to 6, the dye of which the maximum absorption wavelength is in a range of 500 nm or greater and less than 550 nm may include at least one kind of C. I. Reactive Red 3:1, C. I. Reactive Red 24, and C. I. Reactive Red 218.

APPLICATION EXAMPLE 8

Another aspect of the textile printing method according to the invention includes a step of printing using the ink composition for ink jet textile printing described in any one of Application Examples 1 to 7 with respect to a fabric which is pretreated using at least one of an alkali agent and a hydrotropy agent.

According to the textile printing method of Application Example 8, it is possible to record an image having an excellent discharging property, excellent color reproducibility and coloring properties.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
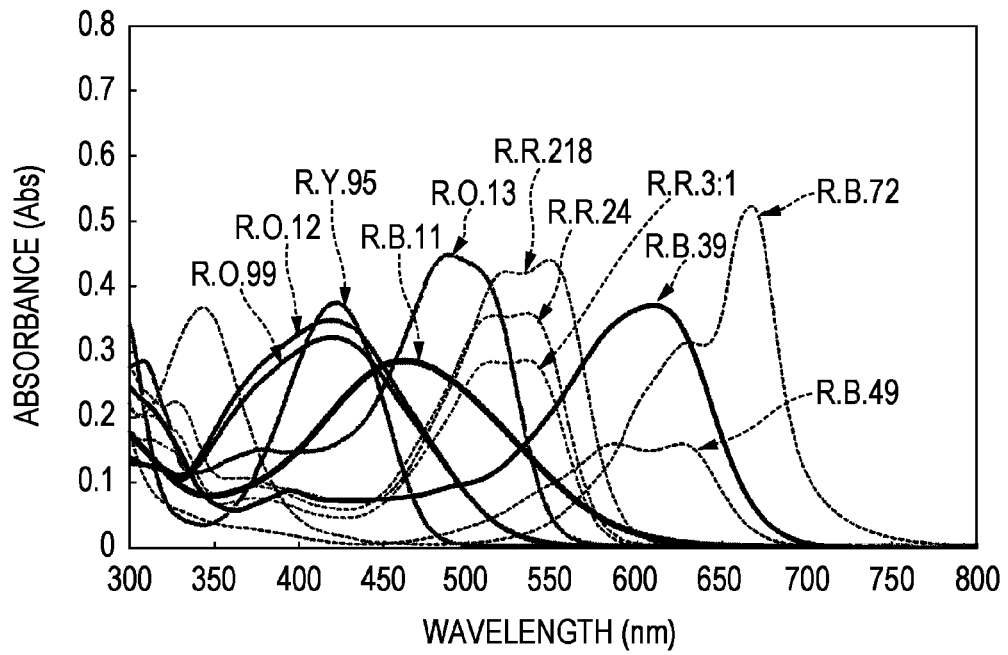
FIG. 1 is a view illustrating spectral distributions of respective dyes used in Examples.

Hereinafter, the preferred embodiments of the invention will be described. The embodiments described below merely describe an example of the invention. Further, the invention is not limited to the following embodiments and includes various modifications performed within the range without departing from the scope of the invention.

Hereinafter, the invention is broadly divided into the ink composition for ink jet textile printing and the textile printing method, and description will be made in this order. In this specification, "ink jet textile printing" means recording (printing) an ink on (a surface of) a fabric which is a kind of a recording medium using an ink jet method, and is a kind of ink jet recording. "Printed material" or "recorded material" means an image formed by recording (printing) ink on (a surface of) a fabric which is a kind of recording medium.

1. Ink Composition

The ink composition for ink jet textile printing according to an embodiment of the invention is an ink composition which includes each dye satisfying the following conditions A, B, and C, two or more kinds of solvent having a boiling point of 190° C. or higher and lower than 260° C. under a pressure of 1 atm, and water, in which the solvent includes 5% by mass or greater of a nitrogen-containing heterocyclic compound with respect to the total mass of the ink composition and 5% by mass or greater of an alkyl polyol with respect to the total mass of the ink composition.

A: Maximum absorption wavelength is in a range of 550 nm and 750 nm

B: Maximum absorption wavelength is in a range of 450 nm or greater and less than 500 nm C: Maximum absorption wavelength is in a range of 400 nm or greater and less than 450 nm Hereinafter, a dye, a solvent, water, and other additives included in the ink composition for ink jet textile printing according to the embodiment will be described in this order.

1.1. Dye

The ink composition for ink jet textile printing according to the embodiment contains each dye satisfying the above conditions A, B, and C. Hereinafter, description will be performed with a dye satisfying the above condition A being represented as "Dye A", a dye satisfying the above condition B being represented as "Dye B", and a dye satisfying the above condition C being represented as "Dye C".

The ink composition for ink jet textile printing according to the embodiment contains three or more kinds of dye having maximum absorption wavelengths different from each other in a visible light wavelength region (380 nm to 780 nm). The present inventor has found that using an ink composition including Dye A, Dye B, and Dye C having maximum absorption wavelengths in specific wavelength regions different from each other in a visible light wavelength region, it is possible to easily record an image having excellent reproducibility of a black tone.

In the invention, "image having excellent reproducibility of a black tone" indicates an image in which an a* value is in a range of −5 to 5, a b* value is in a range of −5 to 5, and chroma (C*) is 7 or less in CIELAB color space. Moreover, the chroma (C*) represents the distance from an achromatic color having equal brightness, and specifically, is a value calculated by the following equation (i).

$$\text{Chroma } (C^*) = \{(a^*)^2 + (b^*)^2\}^{1/2} \quad (i)$$

The "maximum absorption wavelength" in the invention refers to the wavelength (nm) at the time of the maximum absorbance (Abs) being exhibited in a range of a visible light wavelength region (380 nm to 780 nm). The maximum absorption wavelength and absorbance of the dye can be obtained by a method in which an aqueous solution is prepared such that the concentration of the dye becomes 10 ppm using water as a solvent, the solution is introduced into a quartz cell having an optical path length of 10 mm, and measurement is performed using a spectrophotometer. Examples of the spectrophotometer used in this measurement include double beam spectrophotometers U-2900, U-3000, and U-3300 (hereinbefore, trade names) manufactured by Hitachi High-Technologies Corporation.

Dye A

Dye A is a dye of which the maximum absorption wavelength is in a range of 550 nm to 750 nm. Though the maximum absorption wavelength of Dye A is required to be in a range of 550 nm and 750 nm, the maximum absorption wavelength of Dye A is preferably in a range of 600 nm and 700 nm. If the maximum absorption wavelength of Dye A is in the above range, Dye A acts complementarily with other dyes (Dye B and Dye C), and thus it is possible to obtain an ink composition having excellent reproducibility of a black tone. On the other hand, if the maximum absorption wavelength of Dye A is less than 550 nm, it is difficult to favorably reproduce a black tone.

In Dye A, a reactive dye can be preferably used, and specifically, C. I. Reactive Black 39, C. I. Reactive Blue 49, C. I. Reactive Blue 72, and the like can be exemplified. These dyes may be used alone, or two or more kinds may be used in combination. Among these dyes, from the viewpoint that decomposition of a dye is low and stability is excellent, C. I. Reactive Black 39 and C. I. Reactive Blue 49 are preferable. In addition, from the viewpoint that coloring properties are excellent, C. I. Reactive Black 39 is preferable.

The absorbance at the maximum absorption wavelength of Dye A is preferably 0.3 or greater, and more preferably 0.35 or greater. If the absorbance at the maximum absorption wavelength of Dye A is 0.3 or greater, coloring properties of the obtained image are excellent. In particular, if any one of Dye A, Dye B, and Dye C having the absorbance at the maximum absorption wavelength of 0.3 or greater is used, coloring properties of the obtained image are more favorable.

The content of Dye A is preferably 9% by mass or greater, more preferably 10% by mass or greater, and preferably 10% by mass to 16% by mass with respect to the total mass (100% by mass) of an ink composition. If the content of Dye A is 10% by mass or greater, reproducibility of a black tone and coloring properties (color forming density) are excellent.

In particular, if the content of Dye A is 10% by mass or greater (preferably 10% by mass to 16% by mass) with respect to the total mass of an ink composition and the total amount of the dye included in the ink composition is 11% by mass or greater with respect to the total mass of the ink composition (preferably 13% or greater, and more preferably 13% by mass to 18% by mass %), reproducibility of a black tone and coloring properties are more excellent, and reliability is excellent.

Dye B

Dye B is a dye of which the maximum absorption wavelength is in a range of 450 nm or greater and less than 500 nm. Though the maximum absorption wavelength of Dye B is required to be in a range of 450 nm or greater and less than 500 nm, the maximum absorption wavelength of Dye B is preferably in a range of 460 nm to 490 nm. If the maximum absorption wavelength of Dye B is in the above range, Dye B acts complementarily with other dyes (Dye A and Dye C), and thus it is possible to obtain an ink composition having excellent reproducibility of a black tone. On the other hand, if the maximum absorption wavelength of Dye B is out of the above range, it is difficult to favorably reproduce a black tone.

In Dye B, a reactive dye can be preferably used, and specifically, C. I. Reactive Orange 13, C. I. Reactive Brown 11, and the like can be exemplified. These dyes may be used alone, or two or more kinds may be used in combination. Among these dyes, from the viewpoint that stability of a dye is excellent and reproducibility of a black tone is further improved, C. I. Reactive Orange 13 is preferable.

The absorbance at the maximum absorption wavelength of Dye B is preferably 0.3 or greater, and more preferably 0.4 or greater. If the absorbance at the maximum absorption wavelength of Dye B is 0.3 or greater, coloring properties of the obtained image are excellent.

The content of Dye B is preferably 1% by mass or greater, more preferably 1.5% by mass or greater, and preferably 1.5% by mass to 3% by mass with respect to the total mass (100% by mass) of an ink composition. If the content of Dye B is in the above range, reproducibility of a black tone and coloring properties are excellent.

Dye C

Dye C is a dye of which the maximum absorption wavelength is in a range of 400 nm or greater and less than 450 nm. Though the maximum absorption wavelength of Dye C is required to be in a range of 400 nm or greater and less than 450 nm, the maximum absorption wavelength of Dye C is preferably in a range of 400 nm to 430 nm. If the maximum absorption wavelength of Dye C is in the above range, Dye C acts complementarily with other dyes (Dye A and Dye B), and thus it is possible to obtain an ink composition having excellent reproducibility of a black tone. On the other hand, if the maximum absorption wavelength of Dye C is out of the above range, it is difficult to favorably reproduce a black tone.

In Dye C, a reactive dye can be preferably used, and specifically, C. I. Reactive Orange 12, C. I. Reactive Orange 99, C. I. Reactive Yellow 95, and the like can be exemplified. These dyes may be used alone, or two or more kinds may be used in combination. Among these dyes, from the viewpoint that reproducibility of a black tone is further improved, C. I. Reactive Orange 12 is preferable.

The absorbance at the maximum absorption wavelength of Dye C is preferably 0.3 or greater. If the absorbance at the maximum absorption wavelength of Dye C is 0.3 or greater, coloring properties of the obtained image are excellent.

The content of Dye C is preferably 1.5% by mass or greater, more preferably 2% by mass or greater, and preferably 2% by mass to 4% by mass with respect to the total mass (100% by mass) of an ink composition. If the content of Dye C is in the above range, reproducibility of a black tone and coloring properties are excellent.

Dye D

The ink composition for ink jet textile printing according to the embodiment preferably further contains a dye (hereinafter, referred to as "Dye D") of which the maximum absorption wavelength is in a range of 500 nm or greater and less than 550 nm. Though the maximum absorption wavelength of Dye D is required to be in a range of 500 nm or greater and less than 550 nm, the maximum absorption wavelength of Dye D is preferably in a range of 520 nm to 550 nm. If the ink composition contains Dye D of which the maximum absorption wavelength is in the above range in addition to Dye A, Dye B, and Dye C, reproducibility of a black tone and coloring properties are more excellent.

In Dye D, a reactive dye can be preferably used, and specifically, C. I. Reactive Red 3:1, C. I. Reactive Red 24, C. I. Reactive Red 218, and the like can be exemplified. These dyes may be used alone, or two or more kinds may be used in combination. Among these dyes, from the viewpoint that stability of a dye is excellent and reproducibility of a black tone is further improved, C. I. Reactive Red 3:1 is preferable.

The absorbance at the maximum absorption wavelength of Dye D is preferably 0.25 or greater. If the absorbance at the maximum absorption wavelength of Dye D is 0.25 or greater, coloring properties of the obtained image are excellent.

The content of Dye D is preferably 1% by mass or greater, more preferably 1.5% by mass or greater, and preferably 1.5% by mass to 3% by mass with respect to the total mass (100% by mass) of an ink composition. If the content of Dye D is in the above range, reproducibility of a black tone and coloring properties are excellent.

1.2 Solvent

The ink composition for ink jet textile printing according to the embodiment contains two or more kinds of solvent having a boiling point (standard boiling point) of 190° C. or higher and lower than 260° C. under a pressure of 1 atm, and the solvents include at least a nitrogen-containing heterocyclic compound and an alkyl polyol.

Though the standard boiling point of the solvents is required to be in a range of 190° C. or higher and lower than 260° C., 210° C. to 250° C. is preferable. If the standard boiling point of the solvents is in the above range, the balance between a drying property and a moisture retaining property of the ink is favorable, and it is possible to suppress clogging of the nozzles of the recording head. On the other hand, if the standard boiling point of the solvents is lower than 190° C., there is an advantage in that a drying property of the ink is favorable, and due to this, a recording speed of an image or the like can be improved, however, a drying property of the ink adhered near the nozzles of the recording head is increased, and clogging of the nozzles is likely to occur. In addition, if the standard boiling point of the solvents is 260° C. or higher, it is possible to suppress drying of the ink adhered near the nozzles, however, by increase in the concentration of the solvent adhered near the nozzles, the solvent is thickened, and clogging of the nozzles is likely to occur. Furthermore, if the standard boiling point of the solvents is 260° C. or higher, since the solvent is less likely to be evaporated in a heat treatment step described later, and due to this, the solvent remains in a fabric, a problem in which deterioration in color reproducibility and coloring properties of an image is caused due to dyeing of a dye being inhibited is likely to be generated.

The total amount of the solvent having a standard boiling point of 190° C. or higher and lower than 260° C. is preferably 5% by mass to 25% by mass, and more preferably 10% by mass to 20% by mass with respect to the total mass of the ink composition. If the total amount of the solvent is in the above range, the balance between a drying property and a moisture retaining property of the ink tends to become more favorable.

Nitrogen-containing Heterocyclic Compound

A nitrogen-containing heterocyclic compound having a standard boiling point of 190° C. or higher and lower than 260° C. has excellent solubility with respect to the dyes described above, and has a function of suppressing solidification and drying of the ink composition.

Specific examples of a nitrogen-containing heterocyclic compound having a standard boiling point of 190° C. or higher and lower than 260° C. include N-methyl-2-pyrrolidone [204° C.], N-ethyl-2-pyrrolidone [212° C.], N-vinyl-2-pyrrolidone [193° C.], 2-pyrrolidone [245° C.], and 5-methyl-2-pyrrolidone [248° C.] The numerical values in parentheses represent the standard boiling point. These nitrogen-containing heterocyclic compounds may be used alone or in combination of two or more kinds thereof.

Though the content of the nitrogen-containing heterocyclic compound having a standard boiling point of 190° C. or higher and lower than 260° C. is required to be 5% by mass or greater, the content is preferably 5% by mass to 15% by mass, and more preferably 5% by mass to 10% by mass with respect to the total mass of the ink composition. If the content of the nitrogen-containing heterocyclic compound is 5% by mass or greater, it is possible to effectively suppress occurrence of clogging of the nozzles, and if the content is 15% by mass or less, it is possible to obtain an image having excellent color reproducibility and coloring properties. On the other hand, if the content of the nitrogen-containing heterocyclic compound is less than 5% by mass, clogging of the nozzles occurs significantly.

Alkyl Polyol

An alkyl polyol having a standard boiling point of 190° C. or higher and lower than 260° C. has a function of suppressing solidification and drying of the ink composition.

Specific examples of alkyl polyol having a standard boiling point of 190° C. or higher and lower than 260° C. include 1,2-butanediol [194° C.], 1,2-pentanediol [210° C.], 1,2-hexanediol [224° C.], 1,2-heptanediol [227° C.], 1,3-propanediol [210° C.], 1,3-butanediol [230° C.], 1,4-butanediol [230° C.], 1,5-pentanediol [242° C.], 1,6-hexanediol [250° C.], 2-ethyl-2-methyl-1,3-propanediol [226° C.], 2-methyl-2-propyl-1,3-propanediol [230° C.], 2-methyl-1,3-propanediol [214° C.], 2,2-dimethyl-1,3-propanediol [210° C.], 3-methyl-1,3-butanediol [203° C.], 2-ethyl-1,3-hexanediol [244° C.], 3-methyl-1,5-pentanediol [250° C.], 2-methylpentane-2,4-diol [197° C.], diethylene glycol [245° C.], and dipropylene glycol [232° C.] Moreover, the numerical values in parentheses represent the standard boiling point. These alkyl polyols may be used alone or in combination of two or more kinds thereof.

The content of the alkyl polyol having a standard boiling point of 190° C. or higher and lower than 260° C. is required to be 5% by mass or greater, but the content is preferably 5% by mass to 15% by mass, and more preferably 5% by mass to 10% by mass with respect to the total mass of the ink composition. If the content of the alkyl polyol is 5% by mass or greater, it is possible to effectively suppress occurrence of clogging of the nozzles, and if the content is 15% by mass or less, it is possible to obtain an image having excellent color reproducibility and coloring properties. On the other hand, if the content of the alkyl polyol is less than 5% by mass, clogging of the nozzles occurs significantly.

The ink composition for ink jet textile printing according to the embodiment preferably does not substantially contain an alkyl polyol having a standard boiling point of 260° C. or higher. This is because an alkyl polyol having a standard boiling point of 260° C. or higher inhibits a dyeing property of the dye, and due to this, color reproducibility or coloring properties of an image deteriorate, or clogging of the nozzles easily occurs. Specific examples of the alkyl polyols having a standard boiling point of 260° C. or higher include triethylene glycol [287° C.] and glycerin [290° C.].

In the invention, the expression "does not substantially contain A" means the extent that A is not intentionally added when the ink is produced, and that it is not problematic even if minute amounts of A inevitably mixed in or generated during production or during storage of the ink are included. As specific examples of "does not substantially contain", not including 1.0% by mass or greater, preferably not including 0.5% by mass or greater, more preferably not including 0.1% by mass or greater, "still more preferably not including 0.05% by mass or greater, and "particularly preferably not including 0.01% by mass or greater can be exemplified.

Other Solvents

The solvent having a standard boiling point of 190° C. or higher and lower than 260° C. may further include a solvent other than the nitrogen-containing heterocyclic compound and the alkyl polyol described above. Though such a solvent is not particularly limited, a glycol ether and a lactone having a standard boiling point of 190° C. or higher and lower than 260° C. can be exemplified. Since a glycol ether and a lactone can favorably control wettability or penetration speed of the ink, there is a case of being capable of improving coloring properties of an image. As a glycol ether having a standard boiling point of 190° C. or higher and lower than 260° C., diethylene glycol monobutyl ether [230° C.] can be exemplified. As a lactone having a standard boiling point of 190° C. or higher and lower than 260° C., γ-butyrolactone [204° C.] can be exemplified. Moreover, the numerical values in parentheses represent the standard boiling point.

1.3. Water

The ink composition for ink jet textile printing according to the embodiment contains water. Water is a main medium of the ink composition. The water is preferably water in which ionic impurities have been removed as much as possible, such as pure water or ultrapure water including ion exchange water, ultrafiltration water, reverse osmosis water, or distilled water. The content of water, for example, can be 50% by mass or greater with respect to the total mass of the ink composition.

1.4. Other Additives

The ink composition for ink jet textile printing according to the embodiment may contain a surfactant, ureas, saccharides, a pH adjusting agent, a chelating agent, a preservative, a fungicide, an anticorrosive agent, or the like, as necessary.

Surfactant

The surfactant has a function of adjusting wettability with respect to a recording medium by reducing surface tension of the ink composition. Among surfactants, an acetylene glycol-based surfactant, a silicone-based surfactant, and a fluorine-based surfactant can be preferably used.

Examples of the acetylene glycol-based surfactant, which is not particularly limited, include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (hereinbefore, trade names, manufactured by Air Products and Chemicals. Inc.); Olfine B, Y, P, A, STG, SPC, E1004, E1010, PD-001, PD-002W, PD-003, PD-004, PD-005, EXP. 4001, EXP. 4036, EXP. 4051, AF-103, AF-104, AK-02, SK-14, and AE-3 (hereinbefore, trade names, manufactured by Nissin Chemicals Co., Ltd.); and Acetylenol E00, E00P, E40, and E100 (hereinbefore, trade names, manufactured by Kawaken Fine Chemicals. Co., Ltd.).

As the silicone-based surfactant, which is not particularly limited, a polysiloxane-based compound is preferably exemplified. As the polysiloxane-based compound, which is not particularly limited, for example, polyether-modified organosiloxanes are exemplified. Examples of commercially available products of the polyether-modified organosiloxane include BYK-306, BYK-307, BYK-333, BYK-341, BYK-345, BYK-346, and BYK-348 (hereinbefore, trade names, manufactured by BYK Co., Ltd.); KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (hereinbefore, trade names, manufactured by Shin-Etsu Chemicals Co., Ltd.).

As the fluorine-based surfactant, a fluorine-modified polymer is preferably used, and a specific example thereof includes BYK-340 (manufactured by BYK Co., Ltd.).

In a case where a surfactant is contained, the content thereof can be 0.05% by mass to 1.5% by mass with respect to the total mass of the ink composition.

Ureas

Ureas function as a humectant of an ink, or function as a dyeing assistant for improving a dyeing property of the dye. Specific examples of the ureas includes urea, ethylene urea, tetramethyl urea, thiourea, and 1,3-dimethyl-2-imidazolidinone. In a case where the ureas are included, the content thereof can be 1% by mass to 10% by mass with respect to the total mass of the ink composition.

Saccharides

Saccharides function as a humectant which suppresses solidification or drying of the ink. Specific examples of the saccharides include glucose, mannose, fructose, ribose, xylose, arabinose, galactose, aldonic acid, glucitol (sorbitol), maltose, cellobiose, lactose, sucrose, trehalose, and maltotriose.

pH Adjusting Agent

Examples of the pH adjusting agent include Good's buffers such as potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium hydrogen carbonate, trishydroxymethylaminomethane (THAM), 4-(2-hydroxyethyl)-1-piperazineethanesulfonic acid (HEPES), morpholinoethanesulfonic acid (MES), carbamoylmethyliminobisacetic acid (ADA), piperazine-1,4-bis(2-ethanesulfonic acid) (PIPES), N-(2-acetamido)-2-aminoethanesulfonic acid (ACES), cholamine chloride, N,N-bis(2-hydroxyethyl)-2-aminoethanesulfonic acid (BES), N-tris(hydroxymethyl)methyl-2-aminoethanesulfonic acid (TES), acetamidoglycine, tricine, glycine amide, and bicine, a phosphate buffer solution, and a Tris buffer.

Chelating Agent

Examples of the chelating agent include ethylenediaminetetraacetic acid and salts thereof (disodium dihydrogen ethylenediaminetetraacetate and the like).

Preservative and Fungicide

Examples of the preservative and the fungicide include sodium benzoate, sodium pentachlorophenol, sodium 2-pyridinethiol-1-oxide, sodium sorbate, sodium dehydroacetate, 1,2-dibenzisothiazolin-3-one (Proxel CRL, Proxel BDN, Proxel GXL, Proxel XL.2, Proxel TN, and Proxel LV manufactured by Zeneca Co., Ltd.), and 4-chloro-3-methylphenol (Preventol CMK manufactured by BAYER).

Anticorrosive Agent

Examples of the anticorrosive agent include benzotriazole and the like.

Others

As components other than the above, additives which can be used normally in an ink composition for ink jet textile printing, such as an antioxidant, an ultraviolet absorber, an oxygen absorber, and a solubilizer may be contained.

1.5. Method for Preparing Ink Composition

The ink composition according to the embodiment can be obtained by mixing the above-described components in an arbitrary order and removing impurities by filtration or the like as necessary. As the method of mixing each component, a method of stirring and mixing materials by sequentially adding the materials to a container equipped with a stirrer such as a mechanical stirrer or a magnetic stirrer is preferably used. As the filtration method, a centrifugal filtration or a filter filtration can be performed as necessary.

1.6. Physical Properties

The surface tension of the ink composition according to the embodiment at a temperature of 20° C. is preferably 20 mN/m to 40 mN/m, and more preferably 23 mN/m to 38 mN/m from the viewpoint of balance between the image quality and the reliability as the ink composition for ink jet textile printing. Moreover, the surface tension can be measured by confirming the surface tension at the time of wetting a platinum plate with an ink in the environment of a temperature of 20° C. using an Automatic Surface Tension Analyzer CBVP-Z (trade name, manufactured by Kyowa Interface Science Co., Ltd.).

In addition, from the same viewpoint, the viscosity of the ink composition according to the embodiment at a temperature of 20° C. is preferably 1.5 mPa·s to 10 mPa·s, and more preferably 2 mPa·s to 8 mPa·s. Moreover, the measurement of the viscosity can be performed by measuring the viscosity in an environment of a temperature of 20° C. using a viscoelasticity tester MCR-300 (trade name, manufactured by Physica Co., Ltd.).

2. Textile Printing Method

The textile printing method according to the embodiment includes a step (hereinafter, referred to as "printing step") of printing the ink composition for ink jet textile printing described above on a fabric. Hereinafter, a step which is included and can be included in the textile printing method according to the embodiment will be described in each step.

2.1. Pretreatment Step

In the textile printing method according to the embodiment, a pretreatment step of applying a pretreatment liquid containing at least one of an alkali agent and a hydrotropy agent to a fabric may be provided. Through this, a dyeing property of the dye is further improved.

Examples of the method for applying the pretreatment liquid to a fabric include a method in which a fabric is immersed in the pretreatment liquid, a method in which the pretreatment liquid is coated by a roll coater or the like, a method in which the pretreatment liquid is sprayed (for example, an ink jet method and a spraying method), and any method can be used.

The pretreatment liquid contains at least one of an alkali agent and a hydrotropy agent. The content of these components in the pretreatment liquid can be suitably set according to the type of a fabric, and it is not particularly limited.

In a case of using a reactive dye, the alkali agent is preferably used from the viewpoint of further improving a dyeing property of the reactive dye. Specific examples of the alkali agent include sodium carbonate, sodium hydrogen carbonate, sodium hydroxide, trisodium phosphate, and sodium acetate.

The hydrotropy agent is preferably used from the viewpoint of further improving coloring properties of a recorded image. Examples of the hydrotropy agent include the ureas exemplified in the ink composition.

The pretreatment agent may include a sizing agent. Examples of the sizing agent include starch materials such as corn and wheat, cellulose-based materials such as carboxymethyl cellulose and hydroxymethyl cellulose, polysaccharides such as sodium alginate, gum arabic, locust bean gum, gum tragacanth, guar gum, and tamarind seed, proteins such as gelatin and casein, natural water-soluble polymers such as tannin and lignin, and synthetic water-soluble polymers such as polyvinyl alcohol-based compounds, polyethylene oxide-based compounds, acrylic acid-based compounds, and maleic anhydride-based compounds.

The pretreatment agent may contain components generally used in a pretreatment liquid in textile printing such as water, a sizing agent, an anti-reduction agent, a preservative, a fungicide, a chelating agent, a pH adjusting agent, a surfactant, and the like.

The textile printing method according to the embodiment may include a step of drying the pretreatment liquid applied on a fabric after the pretreatment step. Though drying of the pretreatment liquid may be performed by natural drying, from the viewpoint of improving drying speed, drying with heating is preferable. In a case of being accompanied by heating in the drying step of the pretreatment liquid, the heating method is not particularly limited, and examples thereof include a heat press method, a normal pressure steam method, a high pressure steam method, and a thermofix method. In addition, as a heat source of heating, which is not limited to the following, an infrared ray (lamp) is exemplified.

The material constituting the fabric used in the textile printing method according to the embodiment is not particularly limited, and examples thereof include natural fibers such as cotton, linen, wool, and silk, synthetic fibers such as polypropylene, polyester, acetate, triacetate, polyamide, and polyurethane, and biodegradable fibers such as polylactic acid and the like, and mixed fibers thereof may be used. As the fabric, the fibers described above may be any form of a woven fabric, a knitted fabric, and a non-woven fabric. In particular, in a case of using a reactive dye in the ink composition for ink jet textile printing described above, from the viewpoint of a dyeing property, a fabric including fibers (cotton, linen, rayon, or the like) which have cellulose as a main component is preferably used.

The textile printing method according to the embodiment may be performed using a fabric which has been pretreated with at least one of the alkali agent or the hydrotropy agent in advance. In this case, there is a case where it is not necessary to perform the pretreatment step.

2.2. Printing Step

The textile printing method according to the embodiment includes a step of printing the ink composition for ink jet textile printing described above on a fabric. Specifically, an image is formed on a fabric by adhering ink droplets discharged by the ink jet recording method on the fabric. As the ink jet recording method, any method may be used. Examples of the ink jet recording method include a charge deflection method, a continuous method, an on demand method (piezo type and bubble jet (registered trademark) type). Among these ink jet recording methods, a method using the ink jet recording apparatus of the piezo type is particularly preferably used.

2.3. Heat Treatment Step

The textile printing method according to the embodiment may include a heat treatment step of heat-treating a fabric on which the ink composition is printed. By performing the heat treatment step, a dye is favorably dyed to fibers. As the heat treatment step, known methods in the related art can be used, and examples of the methods include a HT method (high temperature steaming method), a HP method (high pressure steaming method), and a thermosol method.

The temperature in the heat treatment step is preferably in a range of 90° C. to 110° C. from the viewpoint of reducing damage to a fabric.

2.4. Cleaning Step

The textile printing method according to the embodiment may include a cleaning step of cleaning a printed material. The cleaning step is preferably performed after the heat treatment step, and it is possible to effectively remove the dye which is not dyed to the fibers. The cleaning step, for example, can be performed using water, and a soaping treatment may be performed as necessary.

3. Examples

Hereinafter, the invention will be specifically described based on Examples, but the invention is not limited thereto.

3.1. Preparation of Ink Composition for Ink Jet Textile Printing

Respective components were introduced into a container so as to have the composition ratios shown in Table 1, and after the mixture was mixed and stirred for 2 hours using a magnetic stirrer, the resultant product was filtered through a membrane filter having a pore size of 5 μm, whereby the ink compositions according to Examples and Comparative Examples were obtained. Moreover, the numerical values in Table 1 are on a % by mass basis, and the ion exchange water was added such that the total mass of the ink composition became 100% by mass.

In Table 1, the components described other than the compound names are as follows.

- R. B. 39 (C. I. Reactive Black 39, maximum absorption wavelength: 610 nm, absorbance at the maximum absorption wavelength: 0.371)
- R. B. 49 (C. I. Reactive Blue 49, maximum absorption wavelength: 587 nm, absorbance at the maximum absorption wavelength: 0.16)
- R. B. 72 (C. I. Reactive Blue 72, maximum absorption wavelength: 668 nm, absorbance at the maximum absorption wavelength: 0.524)
- R. R. 3:1 (C. I. Reactive Red 3:1, maximum absorption wavelength: 535 nm, absorbance at the maximum absorption wavelength: 0.288)
- R. R. 24 (C. I. Reactive Red 24, maximum absorption wavelength: 535 nm, absorbance at the maximum absorption wavelength: 0.359)
- R. R. 218 (C. I. Reactive Red 218, maximum absorption wavelength: 548 nm, absorbance at the maximum absorption wavelength: 0.440)
- R. O. 13 (C. I. Reactive Orange 13, maximum absorption wavelength: 489 nm, absorbance at the maximum absorption wavelength: 0.448)
- R. B. 11 (C. I. Reactive Brown 11, maximum absorption wavelength: 463 nm, absorbance at the maximum absorption wavelength: 0.287)
- R. O. 12 (C. I. Reactive Orange 12, maximum absorption wavelength: 420 nm, absorbance at the maximum absorption wavelength: 0.348)
- R. O. 99 (C. I. Reactive Orange 99, maximum absorption wavelength: 420 nm, absorbance at the maximum absorption wavelength: 0.323)
- R. Y. 95 (C. I. Reactive Yellow 95, maximum absorption wavelength: 422 nm, absorbance at the maximum absorption wavelength: 0.375)
- DEGmBE (diethylene glycol monobutyl ether, standard boiling point of 230° C.)
- Olfine PD-002W (trade name, manufactured by Nissin Chemical Industry Co., Ltd., acetylene glycol-based surfactant)
- Proxel XL2 (trade name, manufactured by Arch Chemicals)

The maximum absorption wavelength and the absorbance at the maximum absorption wavelength of the dye were obtained by a method in which an aqueous solution was prepared such that the concentration of the dye became 10 ppm using water as a solvent, the solution was introduced into a quartz cell having an optical path length of 10 mm, and measurement was performed using a double beam spectrophotometer U-3300 (trade name, manufactured by Hitachi High-Technologies Corporation). In addition, spectral distributions of respective dyes obtained in this manner are shown in FIG. 1.

3.2. Preparation of Pretreatment Liquid

After thoroughly mixing 5 parts by mass of polyoxyethylene diisopropyl ether (oxyethylene of 30 mol), 5 parts by mass of etherified carboxymethyl cellulose, 100 parts by mass of urea (hydrotropy agent), and 10 parts by mass of m-benzenesulfonic acid sodium salt, stirring was performed at 60° C. for 30 minutes while adding the mixture little by little to 1,000 parts by mass of ion exchange water. Thereafter, after 30% by mass of sodium carbonate (alkali agent) was further added to the solution being stirred, the solution was stirred for 10 minutes and filtered through a membrane filter having a pore size of 10 μm, whereby a pretreatment liquid was obtained.

3.3. Evaluation Methods 3.3.1. Coloring Properties (Color Forming Density)

The pretreatment liquid obtained in the above manner was coated on a fabric (100% cotton), and the resultant product was squeezed at a 20% pickup rate using a mangle and dried. Thereafter, the above-described ink composition was filled into a cartridge of an ink jet printer PX-G930 (manufactured by Seiko Epson Corporation), and an image was printed by adhering the ink composition on a fabric to which the pretreatment was performed. The image resolution was set to 1,440 dpi×720 dpi. After steaming was performed at 102° C. for 10 minutes with respect to the fabric on which an image was printed, the fabric was cleaned at 90° C. for 10 minutes with an aqueous solution including 0.2% by mass of Laccol STA (manufactured by Meisei Chemical Works, Ltd, a surfactant) and dried, and the resultant product was used as an evaluation sample.

Evaluation of coloring properties was performed by measuring the OD value (color forming density) of the image by a colorimetric device (trade name, "Gretag Macbeth Spectrolino", manufactured by X-RITE Co., Ltd.), and the coloring properties of the image were evaluated based on the measured OD value. The evaluation criteria were as follows and the evaluation results are shown in Table 1.

A: OD value was 1.7 or greater
B: OD value was 1.65 or greater and less than 1.7
C: OD value was 1.6 or greater and less than 1.65
D: OD value was less than 1.6

3.3.2. Hue

Using the evaluation sample obtained in the above-described "3.3.1. Coloring Properties (color forming density)", L*, a*, and b* values of the image were measured using a colorimetric device (trade name, "Gretag Macbeth Spectrolino", manufactured by X-RITE Co., Ltd.), and determination of the hue was performed based on the obtained values.

A: $-3<a^*<3$, $-3<b^*<3$, and $C^*<4$
B: $-4<a^*<4$, $-4<b^*<4$, and $C^*<5.5$
C: $-5<a^*<5$, $-5<b^*<5$, and $C^*<7$
D: $5\le|a^*|$, $5\le|b|$, or $7-|C^*|$ 3.3.3. Clogging Reliability The above-described ink composition was filled into a cartridge of the ink jet printer PX-G930 (manufactured by Seiko Epson Corporation). After filling, the presence or absence of a defective filling or nozzle clogging was determined by printing a nozzle check pattern, and the printer was left to stand for one week in an environment of 35° C./40% RH in a state (that is, a state in which the head nozzle surface was capped with the head cap) in which the head was returned to the home position. After being left to stand, the discharging situation of the nozzles was observed by printing a nozzle check pattern, and a clogging property of the ink jet head with respect to the ink composition was evaluated. The evaluation criteria were as follows and the evaluation results are shown in Table 1.

A: By performing cleaning operation one time, the ink composition was normally discharged from all nozzles
B: By performing cleaning operation within a range of two times to five times, the ink composition was normally discharged from all nozzles
C: By performing cleaning operation within a range of six times to ten times, the ink composition was normally discharged from all nozzles D: Cleaning operation of eleven times or more was required until the ink composition was normally discharged from all nozzles, or even when cleaning operation was performed eleven times or more, there was a nozzle from which the ink composition was not normally discharged.

3.3.4. Abnormal Clogging Reliability

In the same manner as in the "Clogging Reliability", the above-described ink composition was filled into a cartridge of the ink jet printer PX-G930 (manufactured by Seiko Epson Corporation), and the presence or absence of a defective filling or nozzle clogging was determined by printing a nozzle check pattern. Then, in the test, the printer was left to stand for one week in an environment of 25° C./40% RH in a state (that is, a state in which the head nozzle surface was easily dried) in which the cap of the printer head was uncapped. After being left to stand, cleaning operation was performed as necessary, and the discharging situation of the nozzles was observed by printing a nozzle check pattern, and a clogging property of the ink jet head with respect to the ink composition was evaluated. The evaluation criteria were as follows and the evaluation results are shown in Table 1.

A: By performing cleaning operation within one time, the ink composition was normally discharged from all nozzles B: By performing cleaning operation within a range of two times to five times, the ink composition was normally discharged from all nozzles C: By performing cleaning operation within a range of six times to ten times, the ink composition was normally discharged from all nozzles D: Cleaning operation of eleven times or more was required until the ink composition was normally discharged from all nozzles, or even when cleaning operation was performed eleven times or more, there was a nozzle from which the ink composition was not normally discharged.

3.3.5 Continuous Discharging Stability

After the above-described ink composition was filled into a cartridge of the ink jet printer PX-G930 (manufactured by Seiko Epson Corporation), solid printing was continuously performed on 1,000 sheets of plain paper with an A4 size, then, the average value of the number of sheets capable of being continuously printed without performing the cleaning operation was determined, and evaluation was performed according to the following evaluation criteria. In addition, the evaluation results are shown in Table 1.

Test Method (1) During printing, at the time when printing defects (disturbance of dots, omission, or curving) occurred, printing was stopped, and recovery was carried out by performing the cleaning operation. In a case where cleaning operation plural times were required for recovery, cleaning operation plural times were regarded as one defect.

(2) A case where printing was paused due to an ink end of the ink cartridge, or a case of a printing defect for which the cause could clearly be considered to be the ink end was not counted, and the ink cartridge was quickly replaced, and printing was resumed.

Evaluation Criteria

A: Average number of continuously printed sheets was 80 sheets or more

B: Average number of continuously printed sheets was 40 sheets or more to less than 80 sheets C: Average number of continuously printed sheets was 20 sheets or more to less than 40 sheets D: Average number of continuously printed sheets was less than 20 sheets 3.4. Evaluation Results The results of the evaluation tests are shown in Table 1.

TABLE 1

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Dye A (wavelength region of 550 nm to 750 nm) | R. B. 39 (Reactive Black 39) R. B. 49 (Reactive Blue 49) R. B. 72 (Reactive Blue 72) | 10 | 10 | 10 | 10 | 10 | 10 | 10 | 11 | 9 | 10 |
| Dye D (wavelength region of 500 nm or greater and less than 550 nm) | R. R. 3:1 (Reactive Red 3:1) R. R. 24 (Reactive Red 24) R. R. 218 (Reactive Red 218) |  |  |  |  |  |  |  | 1.8 |  |  |
| Dye B (wavelength region of 450 nm or greater and less than 500 nm) | R. O. 13 (Reactive Orange 13) R. B. 11 (Reactive Brown 11) | 3 | 3 | 3 | 3 | 3 | 3 | 3 | 1.6 | 3 | 3 |
| Dye C (wavelength region of 400 nm or greater and less than 450 | R. O. 12 (Reactive Orange 12) R. O. 99 (Reactive Orange 99) R. Y. 95 (Reactive Yellow 95) | 2 | 2 | 2 |  2 | 2 | 2 | 2 | 2.1 | 2 | 2 |
| Glycol ether | DEGmBE (standard boiling point of 230° C.) | 2.5 | 2.5 | 2.5 | 2.5 | 2.5 | 2.5 | 2.5 | 2.5 | 2.5 | 2.5 |
| Alkyl polyol | 1,2-Propanediol (standard boiling point of 188° C.) |  |  |  |  |  |  |  |  |  |  |
|  | 1,2-Butanediol (standard boiling point of 195° C.) |  |  |  |  |  |  |  |  |  | 5 |

TABLE 1-continued

|  |  | | | | | | | | | |
|---|---|---|---|---|---|---|---|---|---|---|
|  | 1,2-Pentanediol (standard boiling point of 210° C.) | | | | | | | | | |
|  | Diethylene glycol (standard boiling point of 245° C.) | 5 | 5 | 5 | 15 | 10 | 5 | 5.2 | 5.2 | 5.2 | |
|  | Triethylene glycol (standard boiling point of 287° C.) | | | | | | 3 | | | | |
| Nitrogen-containing heterocyclic compound | N-ethyl-2-pyrrolidone (standard boiling point of 212° C.) | | | | | | | | | | |
|  | 2-pyrrolidone (standard boiling point of 245° C.) | 5 | 15 | 10 | 5 | 5 | 5 | 8 | 8 | 8 | 5 |
| Surfactant | Olfine PD-002W | 0.075 | 0.075 | 0.075 | 0.075 | 0.075 | 0.075 | 0.075 | 0.075 | 0.075 | 0.075 |
| Other additives | Urea | 3.5 | 3.5 | 3.5 | 3.5 | 3.5 | 3.5 | 3.5 | 3.5 | 3.5 | 3.5 |
|  | Trishydroxymethylaminomethane | 0.5 | 0.5 | 0.5 | 0.5 | 0.5 | 0.5 | 0.5 | 0.5 | 0.5 | 0.5 |
|  | Proxel XL2 | 0.09 | 0.09 | 0.09 | 0.09 | 0.09 | 0.09 | 0.09 | 0.09 | 0.09 | 0.09 |
| Water | Ion exchange water | Remainder | Remainder | Remainder | Remainder | Remainder | Remainder | Remainder | Remainder | Remainder | |
|  | Total (% by mass) | 100 | 100 | 100 | 100 | 100 | 100 | 100 | 100 | 100 | |
| Evaluation result | Coloring properties (OD value) | A | B | A | B | B | B | B | A | B | A |
|  | Hue | B | B | B | B | B | B | B | A | C | B |
|  | Clogging reliability | A | A | A | A | A | A | A | A | A | B |
|  | Abnormal clogging reliability | A | A | A | A | A | A | A | A | A | C |
|  | Continuous discharging stability | A | A | A | A | A | A | B | A | A | B |

|  |  | Example 11 | Example 12 | Example 13 | Example 14 | Comparative Example 1 | Comparative Example 2 | Comparative Example 3 | Comparative Example 4 | Comparative Example 5 |
|---|---|---|---|---|---|---|---|---|---|---|
| Dye A (wavelength region of 550 nm to 750 nm) | R. B. 39 (Reactive Black 39) | 10 | 10 | 9 | 12 | 10 | 10 | 10 | 10 | 10 |
|  | R. B. 49 (Reactive Blue 49) | | | | | | | | | |
|  | R. B. 72 (Reactive Blue 72) | | | | | | | | | |
| Dye D (wavelength region of 500 nm or greater and less than 550 nm) | R. R. 3:1 (Reactive Red 3:1) | | | | | | | | | |
|  | R. R. 24 (Reactive Red 24) | | | 1.8 | | | | | | |
|  | R. R. 218 (Reactive Red 218) | | | | 1.8 | | | | | |
| Dye B (wavelength region of 450 nm or greater and less than 500 nm) | R. O. 13 (Reactive Orange 13) | 3 | 3 | 1.6 | 1.6 | 3 | 3 | 3 | 5 | |
|  | R. B. 11 (Reactive Brown 11) | | | | | | | | | |
| Dye C (wavelength region of 400 nm or greater and less than 450 | R. O. 12 (Reactive Orange 12) | 2 | 2 | 2.1 | 2.1 | 2 | 2 | 2 | | 5 |
|  | R. O. 99 (Reactive Orange 99) | | | | | | | | | |
|  | R. Y. 95 (Reactive Yellow 95) | | | | | | | | | |
| Glycol ether | DEGmBE (standard boiling point of 230° C.) | 2.5 | 2.5 | 2.5 | 2.5 | 2.5 | 2.5 | 2.5 | 2.5 | 2.5 |
| Alkyl polyol | 1,2-Propanediol (standard boiling point of 188° C.) | | | | | 2 | 2 | 4 | | |
|  | 1,2-Butanediol (standard boiling point of 195° C.) | | | | | | | | | |
|  | 1,2-Pentanediol (standard boiling point of 210° C.) | 5 | | | | | | | | |
|  | Diethylene glycol (standard boiling point of 245° C.) | | 5 | 5.2 | 5.2 | 3 | 5 | 3 | 5 | 5 |
|  | Triethylene glycol (standard boiling point of 287° C.) | | | | | | | | | |
| Nitrogen-containing heterocyclic compound | N-ethyl-2-pyrrolidone (standard boiling point of 212° C.) | | 5 | | | | | | | |
|  | 2-pyrrolidone (standard boiling point of 245° C.) | 5 | | 8 | 8 | 5 | 3 | 3 | 5 | 5 |

TABLE 1-continued

| | | | | | | | | | | | |
|---|---|---|---|---|---|---|---|---|---|---|---|
| Surfactant | Olfine PD-002W | 0.075 | 0.075 | 0.075 | 0.075 | 0.075 | 0.075 | 0.075 | 0.075 | 0.075 |
| Other additives | Urea | 3.5 | 3.5 | 3.5 | 3.5 | 3.5 | 3.5 | 3.5 | 3.5 | 3.5 |
| | Trishydroxymethylaminomethane | 0.5 | 0.5 | 0.5 | 0.5 | 0.5 | 0.5 | 0.5 | 0.5 | 0.5 |
| | Proxel XL2 | 0.09 | 0.09 | 0.09 | 0.09 | 0.09 | 0.09 | 0.09 | 0.09 | 0.09 |
| Water | Ion exchange water | Remainder | Remainder | Remainder | Remainder | Remainder | Remainder | Remainder | Remainder | Remainder |
| | Total (% by mass) | 100 | 100 | 100 | 100 | 100 | 100 | 100 | 100 | 100 |
| Evaluation result | Coloring properties (OD value) | A | A | B | A | A | A | A | B | C |
| | Hue | B | B | A | A | B | B | B | D | D |
| | Clogging reliability | A | B | A | A | C | D | D | A | A |
| | Abnormal clogging reliability | B | B | A | B | D | C | D | A | A |
| | Continuous discharging stability | A | B | A | A | C | C | D | A | A |

As clearly seen from Table 1, by combining Dye A, Dye B, and Dye C having the maximum absorption wavelength in a specific wavelength region and containing 5% by mass or greater of an alkyl polyol and the nitrogen-containing heterocyclic compound having a standard boiling point of 190° C. or higher and lower than 260° C., respectively, it was possible to obtain an ink composition for ink jet textile printing which had excellent coloring properties and reproducibility of a black tone, and in which occurrence of clogging was suppressed (refer to Examples 1 to 14).

Figure 2:
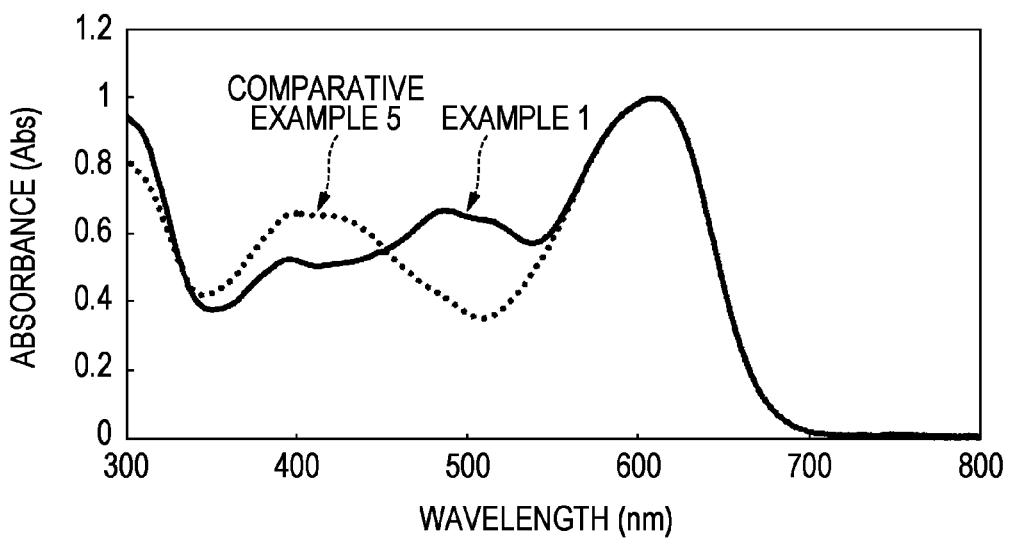
FIG. 2 is a view illustrating spectral distributions of ink compositions used in an Example and Comparative Example.

Spectral distributions of the ink compositions used in Example 1 and Comparative Example 5 are shown in FIG. 2. Since the ink of Example 1 is constituted by combining three kinds of dye, that is, Dye A, Dye B, and Dye C, and the difference among respective absorption wavelengths is relatively small, the ink of Example 1 has stable color reproducibility with no unevenness. In contrast, since the ink of Comparative Example 5 is constituted with only two kinds of dye, that is, Dye A and Dye C, a large valley portion is present between the maximum absorption wavelengths of the two kinds of dye, and the hue becomes unstable for color reproducibility. Moreover, spectral distributions of the ink compositions of Example 1 and Comparative Example 5 were obtained by a method in which an aqueous solution was prepared by diluting each ink composition with water 4,000 times, respectively, the solution was introduced into a quartz cell having an optical path length of 10 mm, and measurement was performed using a double beam spectrophotometer U-3300 (trade name, manufactured by Hitachi High-Technologies Corporation).

On the other hand, in the ink composition used in Comparative Example 1, it was found that since the content of the alkyl polyol having a standard boiling point of 190° C. or higher and lower than 260° C. was less than 5% by mass, occurrence of clogging became significant. In addition, in the ink composition used in Comparative Example 2, it was found that since the content of the nitrogen-containing heterocyclic compound having a standard boiling point of 190° C. or higher and lower than 260° C. was less than 5% by mass, occurrence of clogging became significant. Furthermore, in the ink composition used in Comparative Example 3, it was found that since both the content of the alkyl polyol and the content of the nitrogen-containing heterocyclic compound having a standard boiling point of 190° C. or higher and lower than 260° C. were less than 5% by mass, occurrence of clogging became significant. In addition, in the ink compositions used in Comparative Examples 4 and 5, it was found that since only two kinds of dye having the maximum absorption wavelength in a specific wavelength region were used, color reproducibility of a black color was not excellent.

The invention is not limited to the above-described embodiments and various modifications are possible. For example, the invention includes substantially the same configuration (for example, a configuration in which functions, methods, and results are the same or a configuration in which the purposes or effects are the same) as the configuration described in the embodiments. Further, the invention includes a configuration in which a part which is not substantial in the configuration described in the embodiments is replaced. Furthermore, the invention includes a configuration exerting the same operational effects as those of the configuration described in the embodiments or a configuration capable of implementing the same purposes as those of the configuration described in the embodiments. In addition, the invention includes a configuration made by adding a known technology to the configuration described in the embodiments.

The entire disclosure of Japanese Patent Application No.2013-260135, filed Dec. 17, 2013 is expressly incorporated by reference herein.

What is claimed is:

1. An ink composition for ink jet textile printing, comprising:
    each dye satisfying the following conditions A, B, and C;
    two or more kinds of solvent having a boiling point of 190° C. or higher and lower than 260° C. under a pressure of 1 atm; and
    water,
    wherein the solvent includes 5% by mass to 15% by mass of a nitrogen-containing heterocyclic compound with respect to the total mass of the ink composition and 5% by mass or greater of an alkyl polyol with respect to the total mass of the ink composition;
    A: Maximum absorption wavelength is in a range of 550 nm to 750 nm
    B: Maximum absorption wavelength is in a range of 450 nm or greater and less than 500 nm
    C: Maximum absorption wavelength is in a range of 400 nm or greater and less than 450 nm.

2. The ink composition for ink jet textile printing according to claim 1,
    wherein the dye satisfying the condition A includes at least one kind of C. I. Reactive Black 39, C. I. Reactive Blue 49, and C. I. Reactive Blue 72,
    wherein the dye satisfying the condition B includes at least one of C. I. Reactive Orange 13 and C. I. Reactive Brown 11, and
    wherein the dye satisfying the condition C includes at least one kind of C. I. Reactive Orange 12, C. I. Reactive Orange 99, and C. I. Reactive Yellow 95.

3. The ink composition for ink jet textile printing according to claim 1,
wherein a content of the dye satisfying the condition A is 10% by mass or greater with respect to the total mass of the ink composition, and the total amount of the dye is 13% by mass or greater.

4. The ink composition for ink jet textile printing according to claim 1 which does not substantially contain an alkyl polyol having a boiling point of 260° C. or higher under a pressure of 1 atm.

5. The ink composition for ink jet textile printing according to claim 1,
wherein an absorbance at a maximum absorption wavelength in a case of using an aqueous solution including each dye satisfying the conditions A, B, and C in a concentration of 10 ppm is 0.3 or greater, respectively.

6. The ink composition for ink jet textile printing according to claim 1, further comprising:
a dye of which the maximum absorption wavelength is in a range of 500 nm or greater and less than 550 nm.

7. The ink composition for ink jet textile printing according to claim 6,
wherein the dye of which the maximum absorption wavelength is in a range of 500 nm or greater and less than 550 nm includes at least one kind of C. I. Reactive Red 3:1, C. I. Reactive Red 24, and C. I. Reactive Red 218.

8. A textile printing method, comprising:
printing using the ink composition for ink jet textile printing according to claim 1 with respect to a fabric which is pretreated using at least one of an alkali agent and a hydrotropy agent.

9. A textile printing method, comprising:
printing using the ink composition for ink jet textile printing according to claim 2 with respect to a fabric which is pretreated using at least one of an alkali agent and a hydrotropy agent.

10. A textile printing method, comprising:
printing using the ink composition for ink jet textile printing according to claim 3 with respect to a fabric which is pretreated using at least one of an alkali agent and a hydrotropy agent.

11. A textile printing method, comprising:
printing using the ink composition for ink jet textile printing according to claim 4 with respect to a fabric which is pretreated using at least one of an alkali agent and a hydrotropy agent.

12. A textile printing method, comprising:
printing using the ink composition for ink jet textile printing according to claim 5 with respect to a fabric which is pretreated using at least one of an alkali agent and a hydrotropy agent.

13. A textile printing method, comprising:
printing using the ink composition for ink jet textile printing according to claim 6 with respect to a fabric which is pretreated using at least one of an alkali agent and a hydrotropy agent.

14. A textile printing method, comprising:
printing using the ink composition for ink jet textile printing according to claim 7 with respect to a fabric which is pretreated using at least one of an alkali agent and a hydrotropy agent.

* * * * *